2,477,865

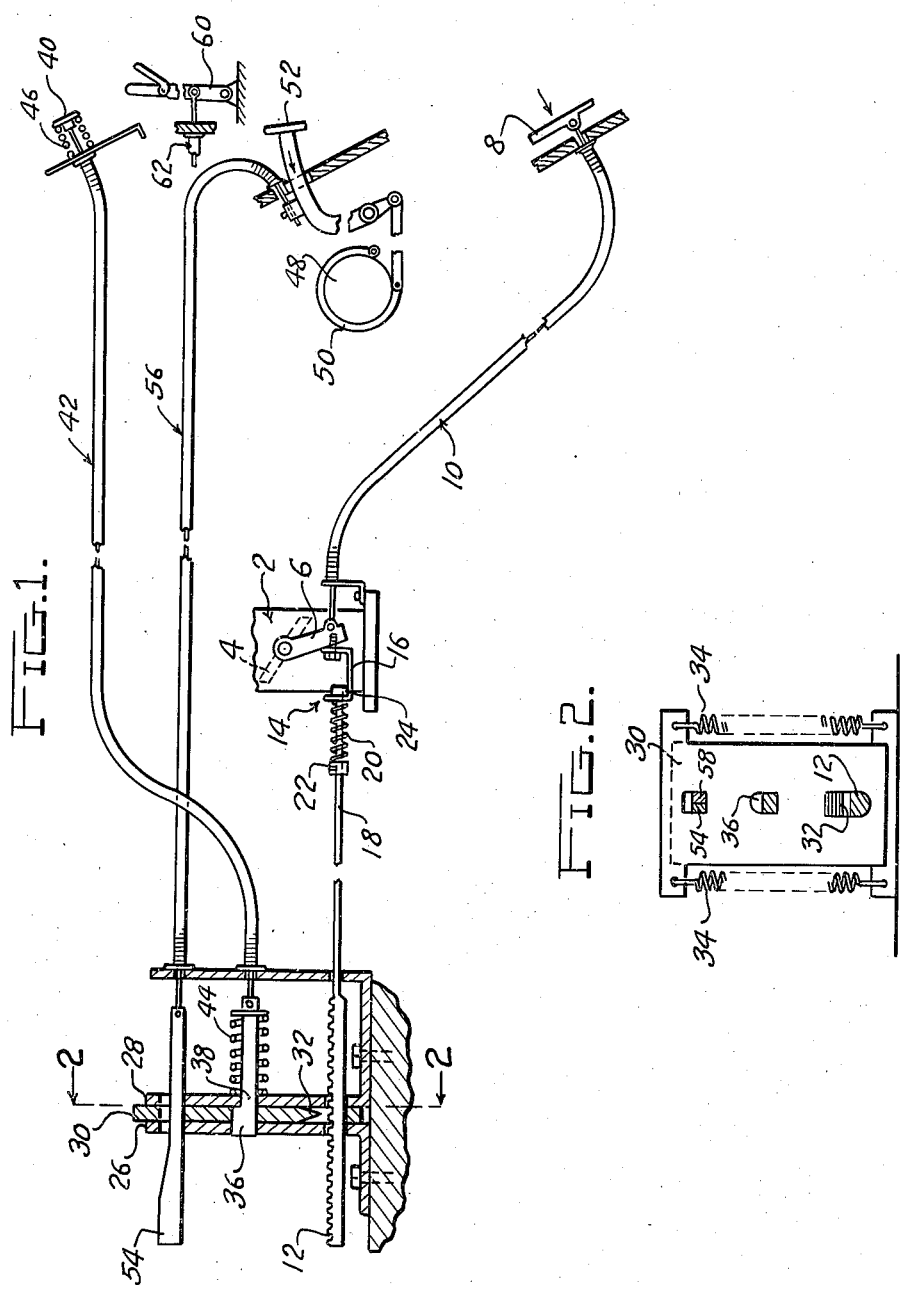
Aug. 2, 1949.  H. DU CHARME  2,477,865
BRAKE CONTROLLED THROTTLE LOCK
Filed July 18, 1946
INVENTOR.
Harold du Charme
BY Hauke & Hardesty
ATTORNEYS Patented Aug. 2, 1949

UNITED STATES PATENT OFFICE 2,477,865

BRAKE CONTROLLED THROTTLE LOCK

Harold du Charme, Grosse Pointe, Mich.

Application July 18, 1946, Serial No. 684,407

4 Claims. (Cl. 192—3)

This invention relates to a brake controlled throttle lock, particularly to a throttle which permits setting the controls to run the engine at an achieved speed.

It often happens that the driver of an automobile wants to set the throttle so that the vehicle operates continuously at the speed decided upon without further attention to the throttle. This is particularly true of driving on the wide, open, western plains of the United States, where the roads are straight and the traffic is often so light that only a few other automobiles may be encountered in several hundred miles. Under these circumstances, fatigue of the throttle foot may be avoided by setting the throttle to hold at a satisfactory speed as soon as that speed is attained. It is desirable that increase of the speed may thereafter be accomplished without disturbing the initial minimum speed setting of the throttle, and that the throttle lock may be instantly released upon application of the brake without any affirmative act by the driver other than "stepping on" the brake pedal or moving the emergency brake lever to the "on" or "set" position.

It is the object of this invention to provide an engine throttle which may be set to hold the engine at a speed reached by the vehicle, but in which the speed may be increased above the set minimum without upsetting the previous speed selection, and in which actuation of either the main operating brakes or the emergency brake releases the throttle setting mechanism to permit return of the throttle to engine idling position.

In the drawings:

Fig. 1 is a schematic showing of the invention and the related parts of an automotive vehicle, and Fig. 2 is a view in section on line 2—2 of Fig. 1.

A carburetor is indicated generally at 2, having a butterfly type throttle valve 4. Throttle valve 4 is connected to be actuated by throttle lever 6. Lever 6 is connected to be operated by accelerator pedal 8 through any suitable flexible connection such as the cable and wire assembly 10.

A toothed member, such as the rack 12, is connected to be moved by operation of throttle lever 6. The operation is accomplished through a lost motion connection 14 comprising strap 16 which is secured at its one end to the throttle lever 6 and is connected at its other end to have sliding engagement with rod 18. Movement of strap 16 relatively to rod 18 is resisted by spring 20 which abuts at one end on strap 16 and at its other end on collar 22. A nut or other suitable collar 24 at the end of rod 18 limits movement of strap 16 relatively to rod 18 toward the right, as seen in Fig. 1.

The toothed member 12 is mounted to reciprocate between two plates 26 and 28 of a fixture in which is mounted a lock member 30. Lock member 30 conveniently takes the form of a plate having a knife edge 32 positioned to engage the rack 12. As is best seen in Fig. 2, lock member 30 is biased toward engagement with toothed member 12 by springs 34.

Lock member 30 is held out of engagement with the toothed member by a holding member, such as key 36, which is reciprocable in the plates 26 and 28, and engages an opening in the lock member. Key 36 is provided with a reduced shank 38, and is mounted to be reciprocated by actuation of a push button 40 mounted on the floor board or on the instrument panel. Push button 40 is operatively connected to key 36 through any suitable flexible connection such as the wire and cable 42. Springs 44 and 46 are disposed to hold the key 36 and button 40 respectively in the position shown in Fig. 1.

A brake drum 48 mounted on the vehicle wheel (not shown) is engaged by brake band 50. The brake band is actuated by pedal 52 through any suitable connection. A cam member 54 is mounted for reciprocation in the plates 26, 28 and 30 by operation of pedal 52. The operative connection is effected preferably by means of a wire and cable arrangement 56.

If desired, a second cam member 58 (see Fig. 2) may be provided adjacent the cam 54. Cam 58 will be connected to be actuated by the emergency lever 60 by means of wire and cable 62. The connection from emergency brake lever 60 to the emergency brake is not shown.

Operation

In operation of the invention, when the driver reaches a speed at which he desires to drive steadily for a period of time, he pushes button 40 to push key 36 out of engagement with lock member 30, permitting the lock member to be pulled by springs 34 into engagement with toothed member 12. The driver can then take his foot off the accelerator and the throttle valve 4 will be held at the achieved speed by means of toothed member 12 and the lock member 30. If now the driver finds it desirable for any reason to momentarily increase speed, he merely pushes his foot down farther on the accelerator pedal 8. Strap 16 thereupon compresses spring 20 on rod 18 as throttle lever 6 moves the throttle valve 4 into a wider open position. If thereafter the driver removes his foot from the accelerator pedal, throttle lever 6 and strap 16 return to the previously set position, holding the vehicle at the previously selected operating sped.

If the driver should wish to release the entire throttle setting mechanism, he need only depress brake pedal 52 slightly, causing cam 54 to lift lock member 30 out of engagement with the toothed member, permitting key 36 to snap back into the position shown in Fig. 1. The same result will be accomplished by movement of the emergency brake lever. Thus release of the throttle setting mechanism is accomplished automatically by actuation of either brake—i. e. the main operating brakes of the vehicle or the emergency brake.

I claim:

1. A vehicle engine throttle control comprising throttle actuating means, vehicle decelerating means, a rack connected with said throttle actuating means, and a locking mechanism associated with said rack comprising a locking plate yieldingly urged into engagement with said rack to hold the throttle in a given operating position for a selected vehicle speed, means slidably supporting said plate for movement into and out of locking engagement with said rack, manually operated means to lock said locking plate out of engagement with the rack, and means operated by operation of the vehicle decelerating means to raise said locking plate out of engagement with said rack, and spring means urging said manually operative plate locking means into locking engagement and effective only when said locking plate is raised to maintain said locking mechanism in an inoperative position.

2. A vehicle engine throttle control comprising throttle actuating means, vehicle decelerating means, a rack connected with said throttle actuating means, and a locking mechanism associated with said rack comprising a locking plate yieldingly urged into engagement with said rack to hold the throttle in a given operating position for a selected vehicle speed, means slidably supporting said plate for movement into and out of locking engagement with said rack, manually operated means to lock said locking plate out of engagement with the rack, and means operated by operation of the vehicle decelerating means to raise said locking plate out of engagement with said rack, said manually operated means comprising a plunger, said plate having an elongated hole through which said plunger projects and is normally engaged to hold said locking plate out of engagement with the rack, said plunger having a portion of reduced dimension, spring means acting on said plunger and normally positioning that portion of the plunger of larger dimension in said elongated hole in the locking plate, said plunger being axially shifted to position that portion of the plunger of reduced dimension in said elongated hole in the locking plate whereby to permit the locking plate to move into locking engagement with the rack and engage the face of the locking plate against the shoulder on said plunger, whereupon the spring means acting on the plunger will be effective to urge the enlarged portion of the plunger into the hole in the locking plate only when same is raised to align said hole with the enlarged portion of said plunger.

3. A vehicle engine throttle control comprising throttle actuating means, vehicle decelerating means, a rack connected with said throttle actuating means, and a locking mechanism associated with said rack comprising a locking plate yieldingly urged into engagement with said rack to hold the throttle in a given operating position for a selected vehicle speed, means slidably supporting said plate for movement into and out of locking engagement with said rack, manually operated means to lock said locking plate out of engagement with the rack, and means operated by operation of the vehicle decelerating means to raise said locking plate out of engagement with said rack, said rack having a lost motion connection with the throttle actuating means allowing same to be advanced beyond the given operating position, and spring means urging said manually operative plate locking means into locking engagement and effective only when said locking plate is raised to maintain said locking mechanism in an inoperative position.

4. A vehicle engine throttle control comprising throttle actuating means, vehicle decelerating means, a rack connected with said throttle actuating means, and a locking mechanism associated with said rack comprising a locking plate yieldingly urged into engagement with said rack to hold the throttle in a given operating position for a selected vehicle speed, means slidably supporting said plate for movement into and out of locking engagement with said rack, manually operated means to lock said locking plate out of engagement with the rack, and means operated by operation of the vehicle decelerating means to raise said locking plate out of engagement with said rack, and spring means urging said manually operative plate locking means into locking engagement and effective only when said locking plate is raised to maintain said locking mechanism in an inoperative position, said locking plate supporting means comprising a pair of spaced plates slidably supporting the locking plate therebetween and having aligned holes respectively supporting the said locking means for said locking plate and the locking plate raising means.

HAROLD du CHARME.

REFERENCES CITED

The following references are of record in the file of this patent:

UNITED STATES PATENTS

| Number | Name | Date |
|---|---|---|
| 1,864,881 | Abel | June 28, 1932 |
| 1,897,357 | Bellis | Feb. 14, 1933 |
| 2,014,854 | Lothrop | Sept. 17, 1935 |
| 2,033,821 | Ellery | Mar. 10, 1936 |
| 2,034,253 | Shelley | Mar. 17, 1936 |
| 2,076,460 | Heinrich | Apr. 6, 1937 |
| 2,127,454 | Wolfe | Aug. 16, 1938 |
| 2,243,354 | Musser | May 27, 1941 |
| 2,364,092 | O'Connor | Dec. 5, 1944 |